(12) United States Patent
Smith et al.

(10) Patent No.: US 9,032,187 B2
(45) Date of Patent: May 12, 2015

(54) INSTRUCTION EXECUTION

(75) Inventors: Peter Smith, Cambridgeshire (GB); David Richard Hargreaves, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 653 days.

(21) Appl. No.: 13/331,716

(22) Filed: Dec. 20, 2011

(65) Prior Publication Data

US 2012/0166770 A1 Jun. 28, 2012

(30) Foreign Application Priority Data

Dec. 24, 2010 (GB) .................................. 1021987.1

(51) Int. Cl.
*G06F 9/30* (2006.01)
*G06F 9/38* (2006.01)
*G06F 9/34* (2006.01)

(52) U.S. Cl.
CPC .......... *G06F 9/3016* (2013.01); *G06F 9/30185* (2013.01)

(58) Field of Classification Search
CPC combination set(s) only.
See application file for complete search history.

(56) References Cited

U.S. PATENT DOCUMENTS

| | | | |
|---|---|---|---|
| 4,680,698 A | 7/1987 | Edwards et al. | |
| 5,303,358 A * | 4/1994 | Baum | 712/226 |
| 6,240,506 B1 * | 5/2001 | Miller | 712/213 |
| 6,253,314 B1 * | 6/2001 | Itoh | 712/226 |
| 6,550,004 B1 * | 4/2003 | Henry et al. | 712/239 |
| 6,651,160 B1 | 11/2003 | Hays | |
| 6,754,813 B1 * | 6/2004 | Nakada | 712/239 |
| 7,421,572 B1 * | 9/2008 | Wolrich et al. | 712/234 |
| 7,827,355 B1 * | 11/2010 | Muthusamy et al. | 711/125 |
| 2001/0025337 A1 | 9/2001 | Worrell et al. | |
| 2002/0056035 A1 | 5/2002 | Rozenshein et al. | |
| 2009/0089564 A1 * | 4/2009 | Brickell et al. | 712/239 |
| 2009/0210658 A1 * | 8/2009 | Arakawa | 712/41 |

OTHER PUBLICATIONS

Hung Boa Vo, et al., "Enhance up to 40% Performance of SH-4A Processor by Using Prefix Instruction", 2010 10the IEEE International Conference on Solid-State and Intergrated Circuit Technology, Nov. 1-4, 2010, pp. 360-362.
UK Search Report dated Apr. 5, 2012, in corresponding GB application.

* cited by examiner

*Primary Examiner* — Eric Coleman
(74) *Attorney, Agent, or Firm* — Vorys, Sater, Seymour and Pease LLP; Vincent M DeLuca

(57) ABSTRACT

A method of executing an instruction set including a first instruction and a second instruction, includes reading the first instruction; determining whether the first instruction is an instruction which is integral with the second instruction; reading the second instruction; if the first instruction is integral with the second instruction, interpreting the operand field of the second instruction to indicate at least one value to be used in conjunction with at least one bit of the first instruction; and if the first instruction is not integral with the second instruction, interpreting the operand field of the second instruction to indicate an entry of a look-up table.

8 Claims, 4 Drawing Sheets

INSTRUCTION EXECUTION

BACKGROUND OF THE INVENTION

This invention relates generally to instruction set computing. In particular the invention relates to a method of executing an instruction set, and an execution processor for executing the instruction set.

Reduced instruction set computing (RISC) processors typically have a fixed bit-width instruction size. Common sizes are 16-bits and 32-bits. 32-bits give flexibility in expressing instructions and operands but at the expense of typically larger code size than the 16-bit instruction sets.

A problem with the short (16-bit) instruction sets is that they have a restricted number of bits for expressing operands. Some processors (for example those operating the reduced instruction set computer architecture MIPS) make use of prefixes. A prefix is an instruction which is associated with another instruction. A prefix contains the same number of bits as the instruction with which it is associated. For example, the MIPS architecture uses short instructions each having 16 bits. Both an MIPS prefix and the MIPS instruction with which it is associated have 16 bits. Generally, a prefix extends the operand of the instruction with which it is associated.

Prefixes have been used to signify that an operand in an instruction is to be interpreted as having the same meaning but in a different location in the instruction. In a simplified example, FIG. 1a illustrates an instruction in which operand A is in location 1, operand B is in location 2, operand C is in location 3, and operand D is in location 4 of an instruction. FIG. 1b illustrates a prefix which precedes the instruction of FIG. 1a and indicates that the operands in locations 1 and 3 of the instruction are to be interchanged. FIG. 1c illustrates the interpretation that the executing processor is left with of the instruction of FIG. 1a as a result of the prefix of FIG. 1b. The operands in locations 1 and 3 have been interchanged. Now operand C is in location 1, operand B in location 2, operand A in location 3, and operand D in location 4. This example is a simplified illustration. In a real situation the prefix would be used to carry out other functions as well as indicating that the operands in locations 1 and 3 of the instruction are to be interchanged.

Prefixes have been used to increase the number of instruction fields available, and to increase the number of bits in the instruction fields of the instruction with which the prefix is associated. For example, U.S. Pat. No. 6,651,160 describes a method of extending the number of addressable registers. Generally MIPS instructions provide 3 bits for each register address. U.S. Pat. No. 6,651,160 discloses 5-bit register addresses. The main instruction includes 3 of the 5 bits of each address, and the prefix associated with the main instruction includes the other 2 of the 5 bits of each address. Full 5-bit register addresses are therefore addressable by the combination of the main instruction and its associated prefix.

Although U.S. Pat. No. 6,651,160 enables 5-bit register addresses to be addressable using the main instruction and its associated prefix, it does not reduce the size of the overall instruction set because 5 bits are still required to describe a 5 bit register address.

There is therefore a need for a method of executing a reduced instruction set which enables information to be conveyed more efficiently by the reduced instruction set.

SUMMARY OF THE INVENTION

According to a first aspect, there is provided a method of executing an instruction set comprising a first instruction and a second instruction, the method comprising: reading the first instruction; determining whether the first instruction is an instruction which is integral with the second instruction; reading the second instruction; if the first instruction is integral with the second instruction, interpreting the operand field of the second instruction to indicate at least one value to be used in conjunction with at least one bit of the first instruction; and if the first instruction is not integral with the second instruction, interpreting the operand field of the second instruction to indicate an entry of a look-up table.

Suitably, the method further comprises, if the first instruction is integral with the second instruction, using the at least one value in conjunction with the at least one bit of the first instruction.

Suitably, the method further comprises, if the first instruction is not integral with the second instruction, extracting the entry in the look-up table indicated by the operand field of the second instruction.

Suitably, the entry in the look-up table is a constant.

Suitably, the at least one value is combined with at least one bit of the first instruction so as to form a further value.

Suitably, the entry in the look-up table is a condition code comparison.

Suitably, the second instruction is a branch instruction.

Suitably, the branch instruction additionally specifies a location to which the branch is to take place.

According to a second aspect, there is provided an execution processor arranged to execute an instruction set comprising a first instruction and a second instruction, the execution processor comprising: an instruction reader arranged to read the first instruction and the second instruction; a determination unit arranged to determine whether the first instruction is an instruction which is integral with the second instruction; an interpretation unit arranged to: if the first instruction is integral with the second instruction, interpret the operand field of the second instruction to indicate at least one value to be used in conjunction with at least one bit of the first instruction; and if the first instruction is not integral with the second instruction, interpret the operand field of the second instruction to indicate an entry of a look-up table.

Suitably, the execution processor is further arranged to, if the first instruction is integral with the second instruction, use the at least one value in conjunction with the at least one bit of the first instruction.

Suitably, the execution processor is further arranged to, if the first instruction is not integral with the second instruction, extract the entry in the look-up table indicated by the operand field of the second instruction.

Suitably, the entry in the look-up table is a constant.

Suitably, the processor is arranged to combine the at least one value with at least one bit of the first instruction so as to form a further value.

Suitably, the entry in the look-up table is a condition code comparison.

BRIEF DESCRIPTION OF THE DRAWINGS

The following disclosure will now be described by way of example with reference to the accompanying drawings. In the drawings.

DETAILED DESCRIPTION OF THE INVENTION

Known reduced instruction sets use short instructions, generally having 16 bits. These instructions can be grouped into three classes:
1) short instructions which are prefixes;
2) short instructions which are not prefixes but which are associated with one or more short instructions which are prefixes; and
3) short instructions which are isolated full instructions.

From hereon instructions which are not prefixes but which are associated with one or more instructions which are prefixes (group 2 above) will be called main instructions.

Known reduced instruction sets which use prefixes do so to extend the operand of the main instruction with which the prefix is associated. The following discussion describes a reduced instruction set which enables a prefix to not only extend the operand of the main instruction, but also to make the instruction set more efficient so that fewer instructions are required to convey the same information content.

Reduced instruction sets typically have 16-bit long instructions, however it is to be understood that the disclosure extends to instructions having any number of bits.

Figures 1A, 1B, 1C:
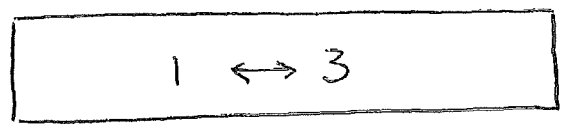
FIG. 1a illustrates an instruction.
FIG. 1b illustrates a prefix.
FIG. 1c illustrates the interpretation of the instruction of FIG. 1a when preceded by the prefix of FIG. 1b.
Figure 2:
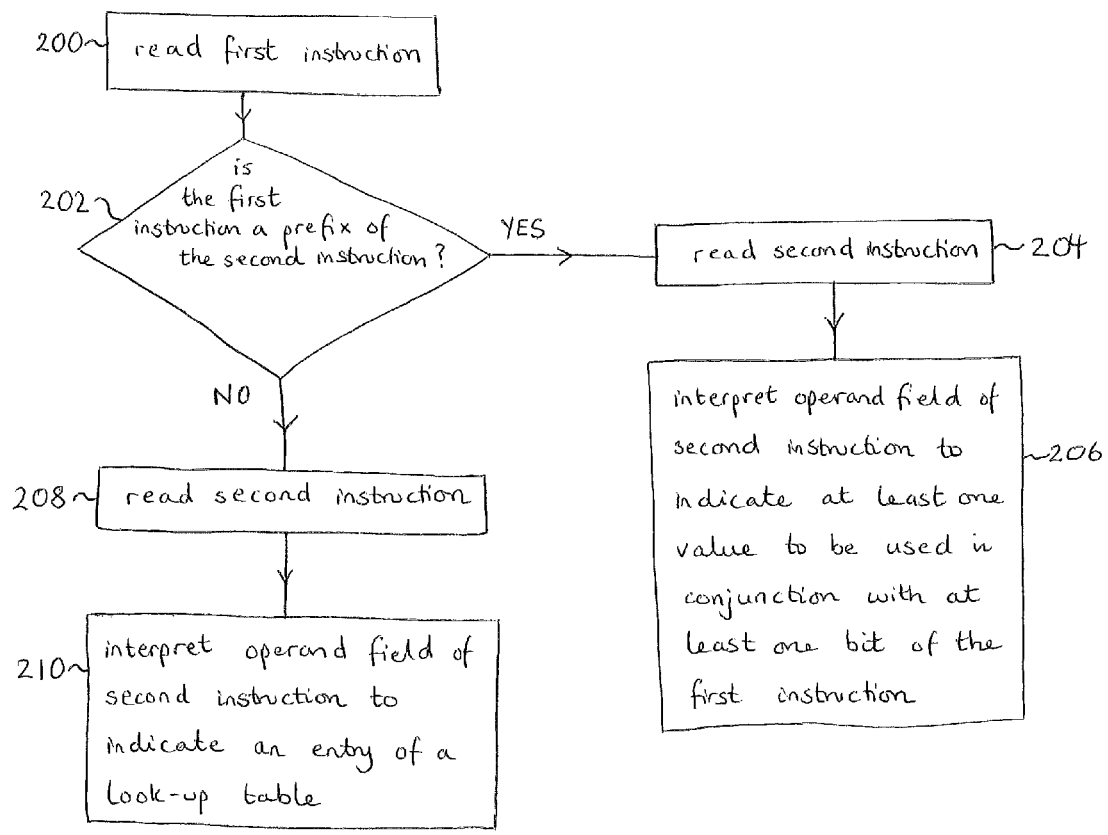
FIG. 2 is a flow diagram illustrating the method by which a processor executes an instruction set according to the protocol described herein.
Figure 3:
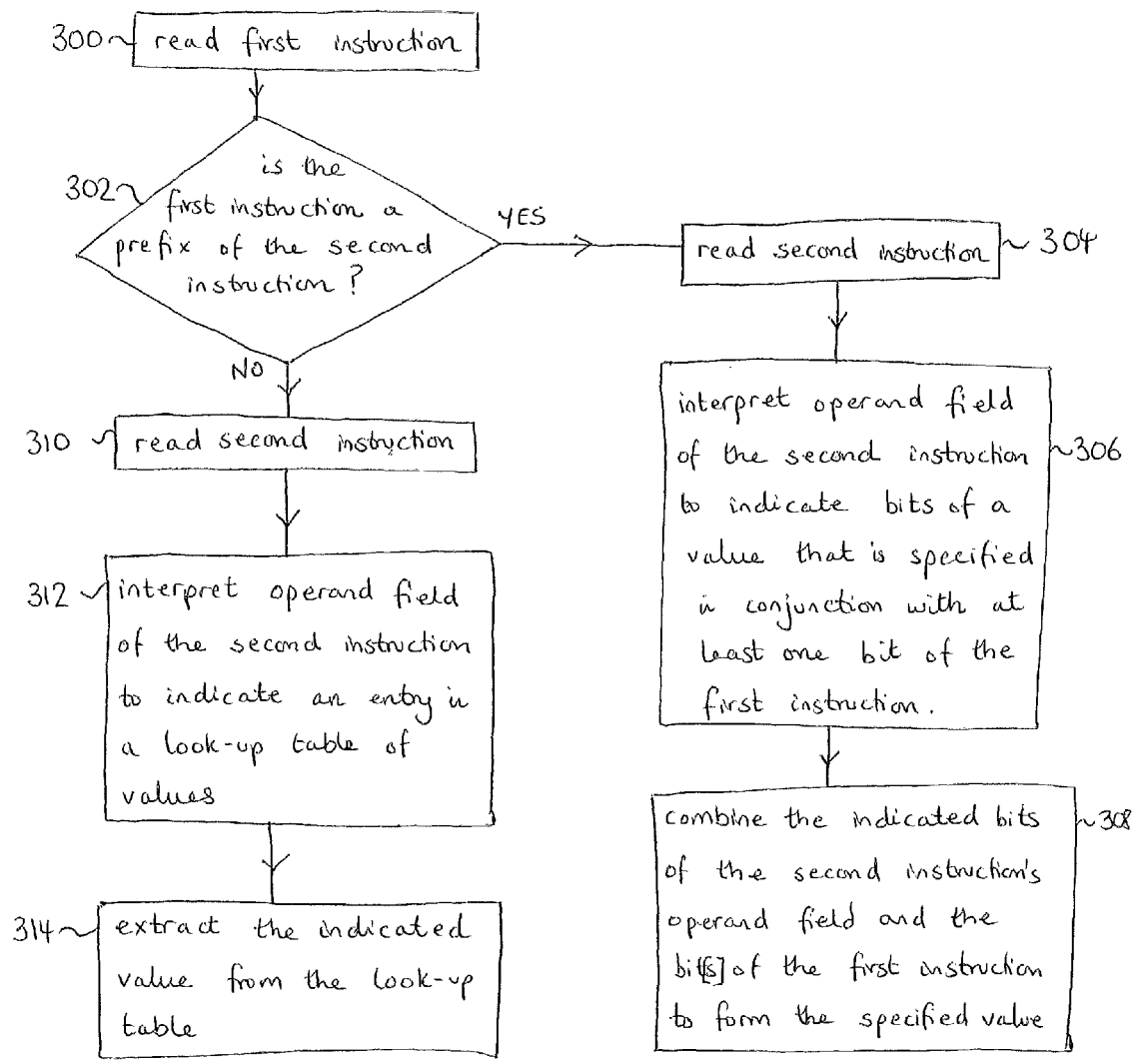
FIG. 3 is a flow diagram illustrating an example of the method described herein wherein an instruction is directed to identifying a value.
Figure 4:
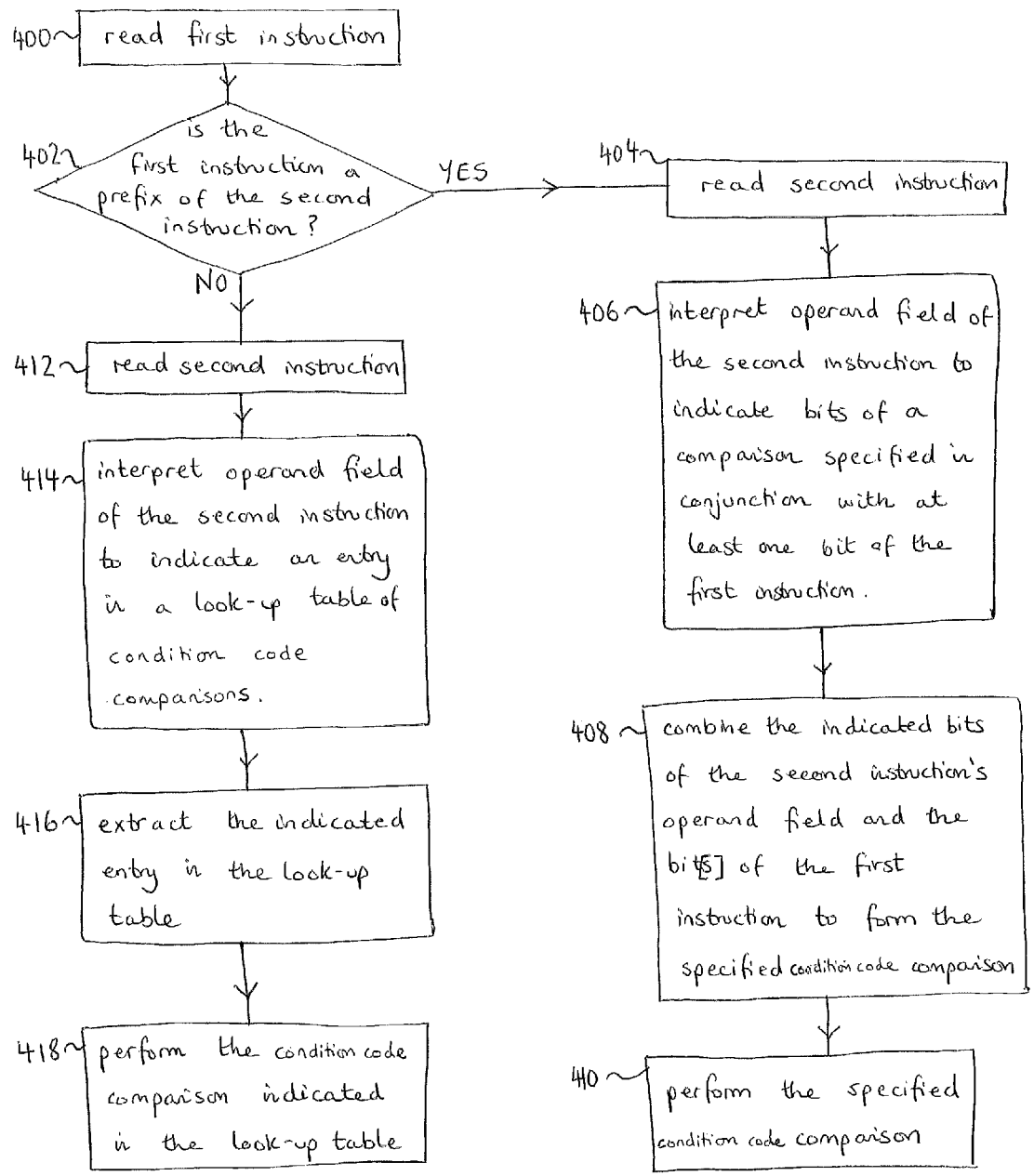
FIG. 4 is a flow diagram illustrating an example of the method described herein wherein an instruction is directed to performing a condition code comparison.

The flow diagrams of FIGS. 2, 3 and 4 illustrate a sequence of steps. It is to be understood that not all the steps in these figures are necessarily required, and that some of the steps may be performed in a different order to that depicted. For example, the first instruction may be read by the execution processor prior to the execution processor reading the second instruction. Alternatively, the second instruction may be read by the execution processor prior to the execution processor reading the first instruction.

FIG. 2 illustrates the method by which a processor executes some instructions in the instruction set. In this example, the instruction set comprises a first instruction and a second instruction. The second instruction is a main instruction. The first instruction is either (i) a prefix associated with the second instruction, or (ii) another instruction unrelated to the second instruction. If the first instruction is a prefix to the second instruction then the second instruction is interpreted as having one meaning. If the first instruction is not a prefix to the second instruction then the second instruction is interpreted as having a different meaning. In this latter situation, the first instruction is unrelated to the second instruction, and is processed by the execution processor accordingly.

Referring to FIG. 2, at step 200 the processor reads the first instruction. At step 202, the processor determines whether the first instruction is a prefix of a second instruction. If the answer to this determination is YES, that the first instruction is a prefix of a second instruction, then the method follows through to step 204 where the second instruction is read. Then, at step 206, the processor interprets the operand of the second instruction to indicate at least one value to be used in conjunction with at least one bit of the first instruction. If the answer to the determination of step 202 is NO, that the first instruction is not a prefix of a second instruction, then the method follows through to step 208 where the second instruction is read. Then, at step 210, the processor interprets the operand field of the second instruction to indicate an entry of a look-up table. The first instruction is not a prefix of the second instruction. The first instruction is therefore processed by the execution processor as usual, i.e. in accordance with known methods.

Following step 206 of interpreting the operand field of the second instruction to indicate at least one value to be used in conjunction with at least one bit of the first instruction, the processor may go on to use the at least one value in conjunction with the at least one bit of the first instruction.

Following step 210 of interpreting the operand field of the second instruction to indicate an entry of a look-up table, the processor may go on to extract the entry in the look-up table indicated by the operand field of the second instruction.

As discussed above, a prefix is an instruction which is associated with another instruction. Generally, a prefix is integral with another instruction. A prefix may be an instruction which forms a part of another instruction. A prefix may take one of many forms. For example, a prefix may include bits which are to be incorporated into the bits of another instruction. A prefix may include bits which are interpreted by an executing processor as altering the meaning of another instruction.

Suitably, the processor determines if the first instruction is a prefix of the second instruction by searching for an identifier in the first instruction. For example, the prefix may include a sequence of bits which are identifiable by the processor as indicating that the instruction is a prefix. In an example instruction set comprising 16-bit long instructions, the identifier of a prefix constitutes the first 4 bits of the prefix. These first 4 bits are 1111. In a different example instruction set the identifier of a prefix could constitute a different number and/or different location of bits in the prefix.

Example 1

FIG. 3 describes one implementation of the disclosed method. This implementation uses the method to determine a value.

At step 300 the processor reads the first instruction. At step 302, the processor determines whether the first instruction is a prefix of a second instruction. If the answer to this determination is YES, that the first instruction is a prefix of a second instruction, then the method follows through to step 304 where the second instruction is read. Then, at step 306, the processor interprets the operand field of the second instruction to indicate bits of a value that is specified in conjunction with at least one bit of the first instruction. Then at step 308, the processor combines the indicated bits of the operand field of the second instruction and the one or more bits of the first instruction to form the specified value. If the answer to the determination of step 302 is NO, that the first instruction is not a prefix of a second instruction, then the method follows through to step 310 where the second instruction is read. Then, at step 312, the processor interprets the operand field of the second instruction to indicate an entry of a look-up table of values. At step 314, the processor extracts the indicated value from the look-up table.

Suitably, the method is used to determine a constant. Commonly used constants are stored in a look-up table at the processor. Examples of commonly used constants are:
Powers of 2 (1,2,4,8 . . . )
Multiples of 8 (8,16,24,32)
Positive and negative integers of small magnitude
This list of commonly used constants is not exhaustive.

Less commonly used constants are not stored in a look-up table. Instead these less common constants are specified wholly by the instruction set. In this example, these less common constants are specified by a combination of bits in the main instruction and bits in the prefix.

This method extends to the determination of any value. Commonly used values are stored in a look-up table at the processor. Any other values may be specified literally by a combination of bits in the main instruction and bits in the prefix.

This implementation enables the complete bit string of a commonly used value to be specified using fewer bits than are in the bit string of that commonly used value. For example a 4-bit look-up table enables 4 bits of an instruction to specify one of 16 values, each of which may be of any length. At the same time, this protocol enables the instructions to specify any value by a combination of bits of the main instruction and bits of the prefix. This enables more efficient transmission of information in the instruction set by increasing the code density in the instruction set.

Example 2

FIG. 4 describes one implementation of the disclosed method. This implementation uses the method to perform a condition code comparison.

A condition is a combination of flags. Flags are typically set following an arithmetic operation. Flags generally indicate a state or outcome of the arithmetic operation. For example:

- a 'negative flag' (N) indicates that the result of the arithmetic operation is negative;
- a 'zero flag' (Z) indicates that the result of the arithmetic operation is zero;
- a 'carry flag' (C) indicates that the result of the arithmetic operation carried past the most significant bit, in other words that the result is greater than the number of available bits to express it; and
- an 'overflow' flag (V) indicates that an arithmetic overflow has occurred during the operation.

This list of flags is not exhaustive.

Combinations of flags are interpreted as having particular meanings which are referred to as 'conditions'. The bit code used to represent a condition is called a condition code.

Examples of conditions are illustrated in the table below. These conditions are all indicated by the four flags N, Z, C and V. A 4-bit condition code is used in an instruction to represent a condition. The execution processor is configured to interpret the 4-bit condition code to represent the condition.

| Condition | Condition Flag State |
|---|---|
| Z (Zero)/EQ (Equal) | Z = 1 |
| NZ (Not Zero)/NE (Not Equal) | Z = 0 |
| C (ALU carry)/NB (Not ALU borrow) | C = 1 |
| NC (Not ALU carry)/B (ALU borrow) | C = 0 |
| NEG (Negative) | N = 1 |
| POS (Positive) | N = 0 |
| V (ALU overflow) | V = 1 |
| NV (Not ALU overflow) | V = 0 |
| HI (unsigned higher) | C = 1 AND Z = 0 |
| LS (unsigned lower or same) | C = 0 OR Z = 1 |
| GE (Signed Greater than or Equal) | N = V |
| LT (Signed Less than) | N != V |
| GT (Signed Greater than) | Z = 0 AND N = V |
| LE (Signed Less than or Equal) | Z = 1 OR N != V |
| USERDEF (user defined) | USERDEF = 1 |

At step 400 the processor reads the first instruction. At step 402, the processor determines whether the first instruction is a prefix of a second instruction. If the answer to this determination is YES, that the first instruction is a prefix of a second instruction, then the method follows through to step 404 where the second instruction is read. Then, at step 406, the processor interprets the operand field of the second instruction to indicate bits of a comparison specified in conjunction with at least one bit of the first instruction. Then at step 408, the processor combines the indicated bits of the operand field of the second instruction and the one or more bits of the first instruction to form the specified condition code comparison. Then, at step 410, the processor performs the specified condition code comparison. If the answer to the determination of step 402 is NO, that the first instruction is not a prefix of a second instruction, then the method follows through to step 412 where the second instruction is read. Then, at step 414, the processor interprets the operand field of the second instruction to indicate an entry of a look-up table of condition code comparisons. At step 416, the processor extracts the indicated entry from the look-up table. At step 418, the processor performs the condition code comparison indicated in the look-up table.

Suitably, the method is used in branch instructions. In other words, the second instruction is a branch instruction, and the first instruction is a prefix of that branch instruction. Suitably, commonly used condition code comparisons are stored in a look-up table at the processor. Less commonly used condition code comparisons are not stored in a look-up table. Instead these less common condition code comparisons are specified wholly by the instruction set. In this example, these less common condition code comparisons are specified by a combination of bits in the main instruction and bits in the prefix.

This implementation enables the complete bit string of a commonly used condition code comparison to be specified using fewer bits than are in the bit string of that commonly used condition code comparison. For example a 4-bit look-up table enables 4 bits of an instruction to specify one of 16 condition code comparisons, each of which may be of any length. At the same time, this protocol enables the instructions to specify any condition code comparison literally by a combination of bits of the main instruction and bits of the prefix. This enables more efficient transmission of information in the instruction set and hence increases the code density of the instruction set. Having reduced the number of bits required for the condition code there are more bits in the instruction left over for other purposes. For example, in the case of branch instructions, there will be more bits left over to specify the branch distance. If the branch distance is greater for a single instruction then the code density is increased.

This disclosure also relates to an execution processor which is arranged to execute an instruction set which is formed according to the protocol described herein. The execution processor is arranged to perform any or all of the methods of FIG. 2, FIG. 3 and FIG. 4.

Preferably, the execution processor is implemented in hardware. Optionally, the execution processor is implemented in software.

The methods and apparatus described herein operate according to a protocol in which the operand field of an instruction is to be interpreted by the executing processor to have one significance when that instruction is not accompanied by a prefix and another significance when that instruction is accompanied by a prefix. In particular, the operand field is interpreted to indicate a look-up table when there is no accompanying prefix, and to indicate literal values to be used in conjunction with bits of the prefix when there is a prefix. These methods and apparatus are more efficient than the prior art discussed in the background section because they enable instructions to be conveyed using fewer bits, i.e. the code density to be increased.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of executing an instruction set comprising a first instruction and a second instruction, the method comprising:
   reading the first instruction;
   determining whether the first instruction is a prefix to the second instruction;
   reading the second instruction;
   if the first instruction is a prefix to the second instruction, interpreting an operand field of the second instruction to indicate at least one value to be used in conjunction with at least one bit of the first instruction and using the at least one value in conjunction with the at least one bit of the first instruction, wherein the combination of the at least one value with the at least one bit of the first instruction is a constant or a condition code comparison; and
   if the first instruction is not a prefix to the second instruction, interpreting the operand field of the second instruction to indicate an entry of a look-up table and extracting the entry in the look-up table indicated by the operand field of the second instruction, wherein the entry in the look-up table is a constant or a condition code comparison,
   wherein the constant or the condition code comparison specified by the combination of the at least one value with the at least one bit of the first instruction is a less commonly used constant or condition code comparison than the constant or the condition code comparison stored in the look-up table.

2. A method as claimed in claim 1, further comprising, if the first instruction is a prefix to the second instruction, using the at least one value in conjunction with the at least one bit of the first instruction.

3. A method as claimed in claim 2, wherein the at least one value is combined with at least one bit of the first instruction so as to form a further value.

4. A method as claimed in claim 1, wherein the second instruction is a branch instruction.

5. A method as claimed in claim 4, wherein the branch instruction additionally specifies a location to which the branch is to take place.

6. An execution processor arranged to execute an instruction set comprising a first instruction and a second instruction, the execution processor comprising processor-executable instructions stored in a non-transitory processor readable medium, which when executed cause the execution processor to:
   read the first instruction and the second instruction;
   determine whether the first instruction is an instruction which is a prefix to the second instruction;
   if the first instruction is a prefix to the second instruction, interpret an operand field of the second instruction to indicate at least one value to be used in conjunction with at least one bit of the first instruction and using the at least one value in conjunction with the at least one bit of the first instruction, wherein the combination of the at least one value with the at least one bit of the first instruction is a constant or a condition code comparison; and
   if the first instruction is not a prefix to the second instruction, interpret the operand field of the second instruction to indicate an entry of a look-up table and extracting the entry in the look-up table indicated by the operand field of the second instruction, wherein the entry in the look-up table is a constant or a condition code comparison,
   wherein the constant or the condition code comparison specified by the combination of the at least one value with the at least one bit of the first instruction is a less commonly used constant or condition code comparison than the constant or the condition code comparison stored in the look-up table.

7. An execution processor as claimed in claim 6, further arranged to, if the first instruction is a prefix to the second instruction, use the at least one value in conjunction with the at least one bit of the first instruction.

8. An execution processor as claimed in claim 7, wherein the processor is arranged to combine the at least one value with at least one bit of the first instruction so as to form a further value.

* * * * *